Nov. 8, 1966    R. M. WILLIAMS    3,283,698
REFINING APPARATUS
Original Filed Nov. 20, 1961    3 Sheets-Sheet 1
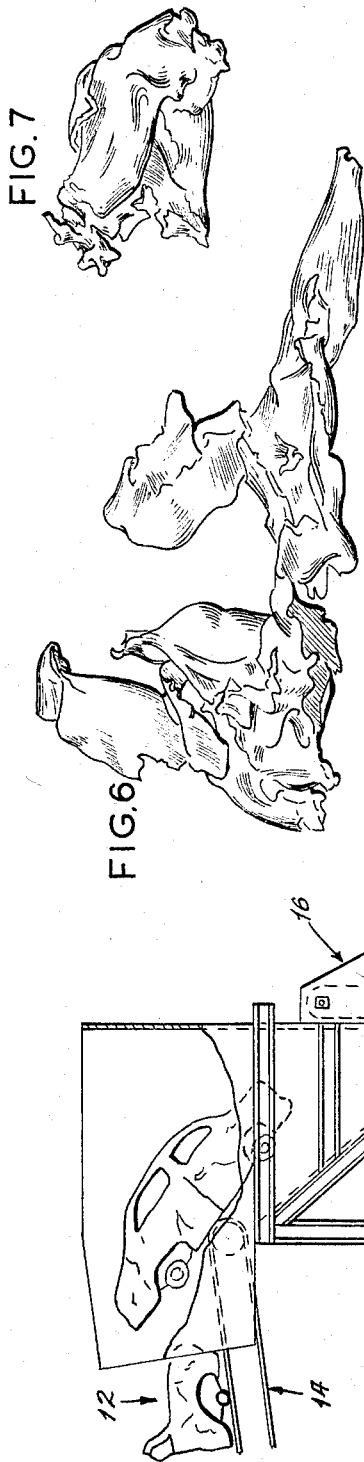
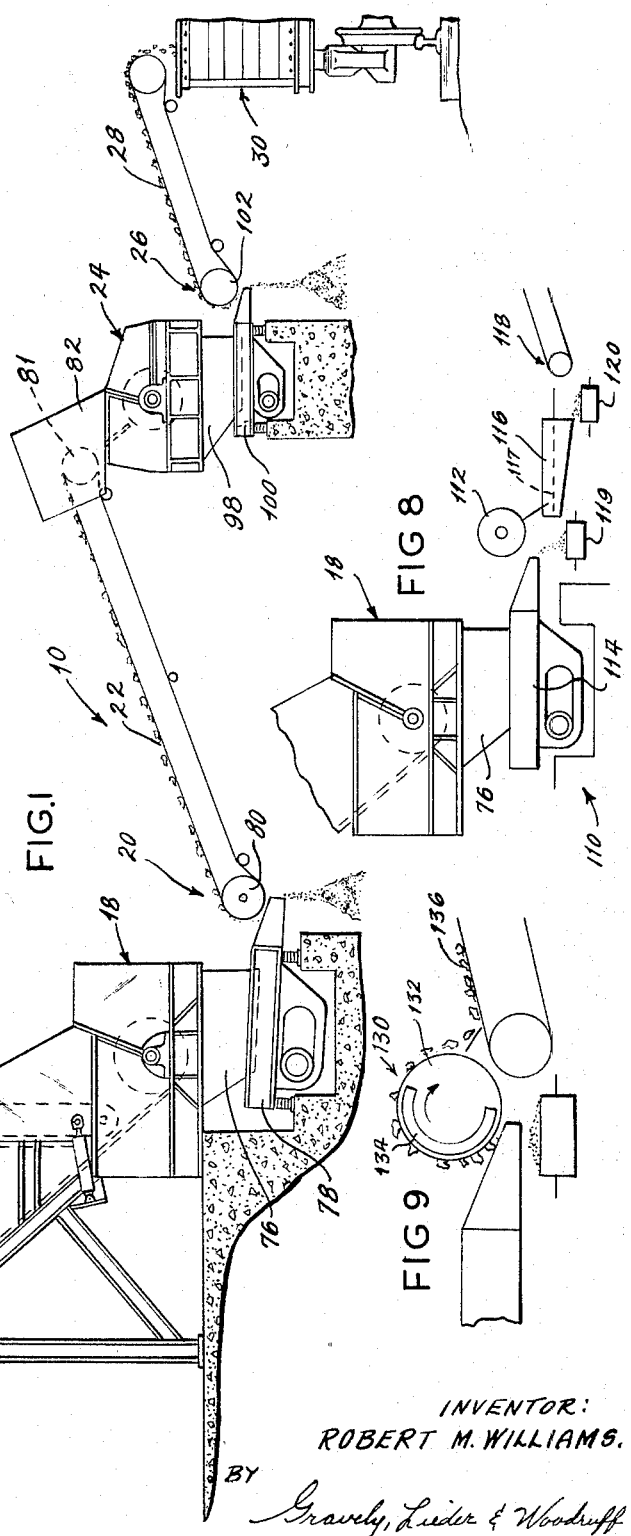
INVENTOR:
ROBERT M. WILLIAMS.
BY
Gravely, Lieder & Woodruff
ATTORNEYS.

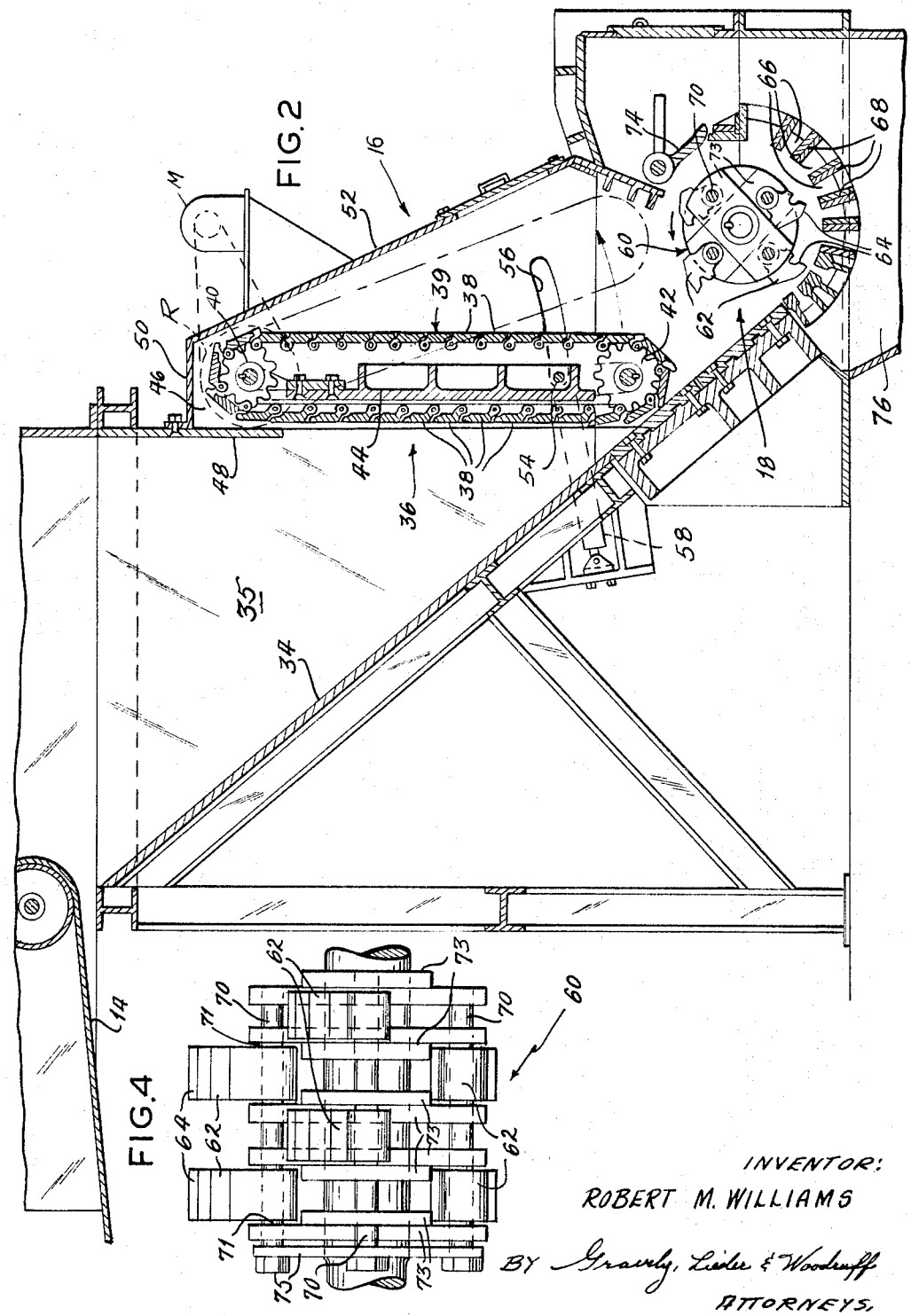

Nov. 8, 1966 R. M. WILLIAMS 3,283,698
REFINING APPARATUS

Original Filed Nov. 20, 1961 3 Sheets-Sheet 3

INVENTOR:
ROBERT M. WILLIAMS
BY Gravely, Lieder & Woodruff
ATTORNEYS

United States Patent Office 3,283,698
Patented Nov. 8, 1966

3,283,698
REFINING APPARATUS
Robert M. Williams, Ladue, Mo., assignor to Williams Patent Crusher & Pulverizer Co., Inc., St. Louis, Mo., a corporation of Missouri
Continuation of application Ser. No. 153,625, Nov. 20, 1961. This application July 19, 1965, Ser. No. 477,078
6 Claims. (Cl. 100—97)

This application is a continuation application of my co-pending application Serial No. 153,625, filed November 20, 1961, now abandoned.

Briefly, the present invention comprises means for processing and refining material such as scrap sheet metal and includes shredding or fragmentizing means, means for separating the ferrous from the non-ferrous fragments, and means for further reducing and individually compacting the ferrous fragments by rolling up the fragments into compact nuggets to increase the product density thereof while maintaining the product in a fluent condition.

Many devices and processes for refining materials have been constructed and used in the past. However, it has not heretofore been possible to refine scrap metal such as scrap metal and the like and obtain an extremely high density product which is also a fluent mass of individual high density pieces. In the case of scrap iron and steel, for example, the present refining apparatus is able to produce a fluent high density mass having a density ranging upward from 80 pounds per cubic foot to 150 pounds per cubic foot and even higher. To obtain these high product densities using the subject apparatus, a process is employed which includes the steps of shredding a raw unrefined product to produce a plurality of individual pieces therefrom, separating the ferrous from the non-ferrous pieces, and increasing the density of the individual ferrous pieces by a nuggetizing step while at the same time maintaining the individuality of the pieces and the fluency of the mass.

It is a principal object of the present invention therefore to provide improved means for refining materials such as scrap metal.

Another object is to increase the density of refined material such as refined scrap metals and the like.

Another object is to provide means to regulate and more evenly feed scrap material such as automobile frames and the like into a refining machine.

Another object is to provide improved means for increasing the density of refined material.

Another object is to increase the density of individual pieces of shredded material while maintaining the individuality of the pieces and the fluency of the mass.

Another object is to produce a refined product consisting of individual pieces that can be readily handled by many different kinds of existing product handling equipment.

Another object is to provide improved means for separating materials according to different characteristics thereof including magnetic characteristics and density characteristics.

Yet another object is to provide relatively simple, inexpensive and easy to operate means for refining materials such as scrap metals and the like.

These and other objects and advantages of the present invention will become apparent after considering the following detailed description of a particular embodiment thereof in conjunction with the accompanying drawings, wherein:

FIG. 1 is a schematic layout of apparatus suitable for carrying out the refining;

FIG. 2 is a cross-sectional view through the input feed and first shredding portions of the apparatus shown in FIG. 1;

FIG. 4 is an enlarged fragmentary cross-sectional view taken on line 4—4 of FIG. 3;

FIG. 6 illustrates a typical fragment or piece of partially refined material, which was part of a larger object that passed through the first shredding operation of the subject device;

FIG. 7 illustrates a typical piece of the same or similar material of FIG. 6 after its refinement has been completed by the subject means and process;

FIG. 8 is a fragmentary side elevational view of a modified material separation device for use with the apparatus of FIG. 1; and FIG. 9 is a fragmentary cross-sectional view of another modified material separation device.

Figure 5:
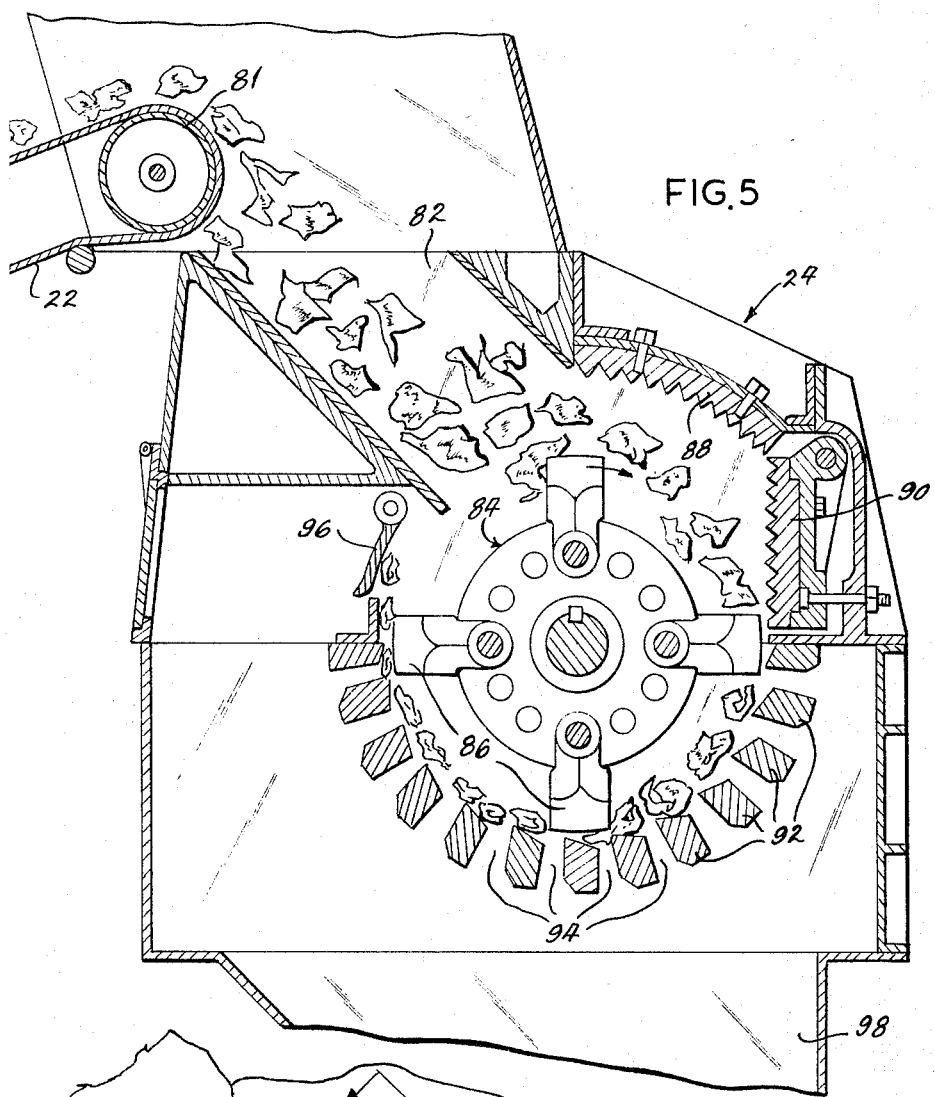
FIG. 5 is an enlarged fragmentary cross-sectional view taken through the center of the second shredding portion of the subject apparatus as shown in FIG. 1.

Referring to the drawings by reference numbers, the number 10 in FIG. 1 refers to an apparatus in which scrap material such as scrap metal is refined by a continuous and fully automatic process. The apparatus 10 has an input portion 12 which includes a conveyor 14 that feeds material such as auto bodies and frames as shown, into a crusher type feed unit 16. The feed unit 16 as will be shown provides a constant and relatively uniform feed of the incoming unrefined material into a shredding or fragmentizing machine 18. The shredder or fragmentizer 18 is a specially constructed hammermill which is designed to break up the incoming material into individual pieces, the sizes and shapes of the pieces being controlled by adjusting certain parts of the shredder 18.

The output of the shredder 18 is fed to a magnetic separation device 20 which separates the ferrous from the non-ferrous materials. The ferrous materials are then carried by a conveyor 22 which deposits them in the input of a nuggetizer machine 24. The nuggetizer further reduces the piece sizes and also importantly increases the density of the individual pieces or fragments of materials as will be shown. The output of the nuggetizer 24 is optionally fed to a second separating unit 26 or alternatively fed directly to an output conveyor 28 which empties into a storage bin or railroad car such as the car 30 shown in FIG. 1. The refined output can also be conveyed directly to a furnace or crucible in a steel mill or otherwise as desired. The various components of the subject apparatus 10 will be described hereinafter more in detail in conjunction with FIGS. 2–5.

In FIG. 2 are shown the details of the crusher feed unit 16 and the shredder 18. The unit 16 has an inclined wall or feed chute 34 down which the incoming scrap is gravity fed after being deposited thereon by the input conveyor 14. The feed chute 34 also has spaced side walls 35. As the incoming material slides down the wall 34 between the side walls 35 it moves against an overhead suspended crusher assembly or curtain structure 36 which partially closes the feed chute and the input to the shredder 18.

The crusher assembly 36 includes a plurality of individual crusher members or plates 38 hingedly connected together to form an endless link belt 39 which extends across the input to the shredder 18. The assembly 36 is preferably wider than the space between the walls 35 of the input chute 34 to prevent particles in the shredder from being thrown outwardly therefrom and from getting back into the feed chute. By so providing, the feed chute can be constructed of relatively inexpensive lightweight materials because they do not have to withstand the constant beating from the shredder 18, and furthermore, by isolating the feed chute 34 from the shredder 18 it is also possible to load the feed chute directly, as by the conveyor 14 or by a crane, which otherwise would not be practical.

The belt 39 extends around upper and lower sprocket members 40 and 42 respectively, and during operation is power driven counterclockwise (FIG. 2) by motor means M connected to a shaft mounted gear reduction unit R. The belt 39 is driven at a rate that can be varied to provide the most efficient operation of the shredder 18. It should also be noted that the left span of the curtain belt 39 moves over and is backed up by a backing platen 44 which supports it and enables it to crush incoming materials such as auto bodies and frames, refrigerator cases and many other bulky forms of scrap.

The upper sprocket 40 is positioned in an overhead housing chamber 46 formed by housing portions 48, 50 and 52, and the lower sprocket 42 and the platen 44 are pivotal about the upper sprocket 40. The assembly 36 also has lugs 54 which extend through arcuate slots 56 formed in the side walls of the shredder housing. The lugs 54 are connected to hydraulic means such as the cylinders 58 located adjacent opposite sides of the housing, and the hydraulic means exert force on the curtain in a direction to maintain the curtain 36 in a position spaced fairly close to the chute 34. The force also is in a direction to crush objects moving down the chute and under the curtain assembly 36. However, the assembly 36 preferably is also able to move away from the chute 34 in opposition to the hydraulic force to prevent jams and to allow larger less crushable objects to pass. The hydraulic means 58 and the traveling action of the belt 39 therefore serve to crush and feed the incoming material at a relatively constant and uniform rate to the shredder 18 and in this way prevent overloading thereof. These conditions are important to efficient operation of the shredder and they also prolong the life of the shredder and reduce repair and maintenance costs.

As the material feeds past the lower end of the curtain assembly 36 it enters the shredder 18. The shredder 18 has a counterclockwise turning rotor assembly 60 which includes a plurality of circumferentially and axially spaced hammers 62. The hammers 62 are constructed to have relatively pointed leading edge portions 64 which engage the incoming material and tear it into a plurality of individual pieces such as the piece shown in FIG. 6. The individual pieces at this point are relatively large and jagged and pass downwardly through openings 66 between spaced grate bars 68 at the bottom of the shredder 18. The openings 66 are preferably relatively large so as to pass fairly large pieces although the size of the openings can be changed or varied without changing the nature of the invention.

Figure 3:
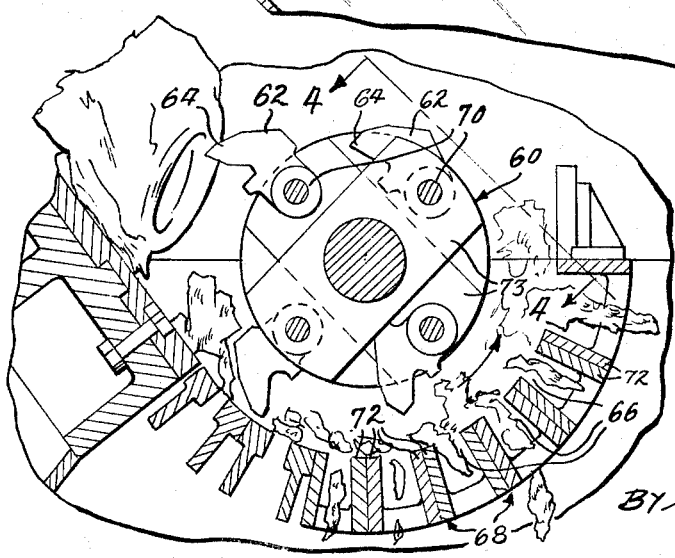
FIG. 3 is an enlarged fragmentary sectional view taken through the center of the shredding portion of the apparatus shown in FIG. 2.

The details of the hammers 62 and the rotor assembly 60 are shown in FIGS. 3 and 4. The rotor assembly 60 is constructed to have the hammers 62 arranged in spaced staggered pairs along its length, so that the opposite hammers of each pair rotate in the same circular path, and so that adjacent pairs of hammers 62 which are positioned at 90° from each other along the length of the rotor assembly 60 sweep adjacent cylindrical areas during each rotation of the assembly 60. With this construction, the hammers of all the pairs along the length of the assembly sweep a cylindrical area which extends the full length of the assembly and is defined by the hammer circle. All of the hammers 62 are pivotally mounted on shafts 70 which extend lengthwise of the assembly 60 (FIG. 4) and all of the hammers are free to pivot on the associated shafts 70 in slots 71 formed in the rotor 60. It is contemplated however, in some constructions to limit the pivotal movement of the hammers by the construction of the members 73. The slots 71 in which the hammers pivot are formed between the end and adjacent sides of spaced substantially rectangular member 73 having rounded ends (FIGS. 2 and 3). The members 73 form the body of the rotor assembly 60 and are arranged in staggered pairs along the rotor assembly 60 (FIG. 4), and the end portions thereof have openings or bores that receive the shafts 70. The ends of the rotor assembly 60 are also provided with round disc members 75 to which the ends of the shafts 70 are attached. Triangular shaped areas or cut outs are formed in the surface of the body assembly 60 between the end portions of adjacent members 73. These areas are swept by the pivoting of the hammers 62. The end portions of the members 73 that form the cut outs in the rotor surface also to some extent act as hammer surfaces.

It should be noted also that the grate bars 68 are formed by pairs of attached members 72, and that a hingedly mounted tramp member 74 is provided so that larger and unrefinable pieces of the material can escape without binding the rotor assembly 60 or causing damage to the machine.

The output from the shredder 18 falls through the grate openings 66 and into a chute 76 therebelow. From there it falls onto a vibrating feed unit 78 (FIG. 1). The feed unit 78 has a bed that is vibrated by suitable means to agitate the shredded material to move it to the right under a rotating magnetic drum assembly 80. The drum 80 is part of the magnetic separating mechanism 20 which is included to separate the ferrous from the non-ferrous pieces. As the material on the vibrator 78 moves under the magnetic drum 80, the ferrous pieces are picked up magnetically and carried in a clockwise direction around the drum 80 and onto an endless conveyor belt 22 which extends around the drum 80. The opposite end of the belt 22 extends around another drum 81 spaced from the drum 80 and positioned over a feed portion 82 of the nuggetizer 24. The ferrous pieces carried by the conveyor belt 22 therefore fall off the end thereof into the feed portion 82 of the nuggetizer 24 which is built along the lines of a hamermill but operates on somewhat different principles. The details of the nuggetizer 24 are shown in FIG. 5, and will be described hereinafter.

The non-ferrous materials that fall on the vibrator 78 move under the magnetic drum 80 and fall off the end thereof into a waste pile, bin, or conveyor.

The main purpose of the nuggetizer 24 is to increase the density of the individual pieces of scrap metal, such as pieces of scrap sheet metal, by rolling and folding the individual pieces into relatively small compact nuggets. In so doing it is also important to maintain the individuality of the pieces and the fluency of the mass for the sake of later handling. The nuggetizer 24 may also further reduce the size of the individual pieces by breaking them into smaller pieces. As already noted, the nuggetizer 24, like the shredder 18, is constructed along the lines of a hammermill, and as such includes a rotor assembly 84 which is shown in FIG. 5 constructed to rotate in a clockwise direction. The rotor assembly 84 has a plurality of relatively blunt pivotally mounted hammers 86 thereon. The material entering the nuggetizer 24 is thrown outwardly by the hammers 86 against breaker plates 88 and 90 and then moves downwardly in a clockwise direction into the space between the hammer circle and wall of the hammer chamber which includes a plurality of spaced grate bars 92. The grate bars 92 are preferably constructed having tapered or beveled surfaces that face the hammer circle with the leading edges of the beveled surfaces being spaced further from the hammer circle than the trailing edges. This is clearly shown in FIG. 5. With this construction for the grate bars 92, and with the provision of relatively blunt hammers 86, the pieces of scrap metal that move into the spaces between the hammer circle and the grate bars, in addition to being cut up or shredded, are also wedged and rolled up into smaller but more dense pieces such as the piece shown in FIG. 7. In this way the density of the pieces is greatly increased and the sizes of the individual pieces correspondingly reduced. Only after the pieces have been reduced in size sufficiently will they pass downwardly through the openings 94 between the adjacent grate bars 92. The construction and operation of the hammers and grate bars 92 are important to the present invention because they enable the product density to be increased without interlocking pieces together and without flattening the pieces as in a rolling mill operation. Furthermore, by nuggetizing the pieces, as described, the product fluency is maintained and the product is better suited for handling, conveying, measuring and for many other operations and uses. It is also more adaptable for handling by many more kinds of equipment. These and other desirable conditions are not obtainable by any other known devices or processes, and all known devices and processes which have included means for increasing density have done so at the expense of some other desirable feature such as product fluency, as by flattening or rolling the pieces, or reducing the size of the individual pieces to such an extent that the equipment involved and the expense of operating it are impractical. These disadvantages and shortcomings of the known equipment and processes are overcome by the present apparatus and process which are relatively inexpensive to construct and operate and employ a minimum of wear parts that require repair, adjustment, and replacement.

The nuggetizer 24 is also provided with a tramp opening device 96 through which relatively large unrefinable pieces can pass without otherwise binding or damaging the machine.

The refined end product falls into an outlet chute 98 and then, if desired, onto another vibrator feed unit 100. The unit 100 can be relaced by a conveyor or it can be used as shown in FIG. 1 in conjunction with a second magnetic separation device 102 to further separate the ferrous from the nonferrous materials. The mechanism shown for performing this further separation is similar to the separator unit 20. After the second optional separation, the material is conveyed on a conveyor 28 and deposited in a bin, a railroad car such as car 30 in FIG. 1, or into some other suitable container. If desired the refined output can also be conveyed directly to a steel mill or the like and deposited in a furnace or crucible.

In FIG. 8 there is shown a modified form 110 of the magnetic separation means 20 for the output of the fragmentizer 18. The modified separating means 110 includes means for making two instead of one separation after the fragmentizing step. In the modified means 110 the fragmentized material drops onto the bed of the vibrating feeder 114 from which the magnetic materials are removed by a drum magnet 112. The material picked up by the drum 112 is then dropped onto a second vibrating feeder 116 where the denser ferrous pieces such as gears, bolts, plate, rods, and the like are separated by the tendencies of the less compact pieces to float to the top of the more compact pieces during the shaking and vibrating separator 117. The denser or more compact pieces are screened out and are dropped onto conveyor 120 which carries them away so that they do not pass through the nuggetizer. The less dense magnetic pieces, such as the pieces of scrap sheet metal not separated continue along conveyor 118 and are fed to the nuggetizer. There is some screen-sorting of the scrap material in separator 117 such as would be the case in separators designed to classify according to sizes alone. The nonmagnetic pieces drop off conveyor 114 onto a removal conveyor 119 where dirt and other nonvaluable waste can be separated from the more valuable materials if desired. The two step separation has the advantage that it separates the denser ferrous objects which are not capable of being nuggetized anyway from the less dense objects or pieces of sheet metal, and prevents the denser pieces from passing through the nuggetizer 24 and possibly causing damage or jams. The second separation also increases the total output of iron and steel.

The second separation can also be obtained using a second separation step similar to that shown in FIG. 1 and by varying the magnetic strength and position of the second drum 80. Other forms of magnetic separating means can also be used without changing the nature of the invention. One such other form is shown in FIG. 9, and includes a magnetic drum 130 that has a rotating shell 132 and a stationary magnet 134 positioned therein. The magnet 134 enables the shell 132 to pick up magnetizable pieces and carry them past the magnet and drop them onto a conveyor belt 136. This type of magnetic separator is particularly useful in systems having metal conveyors which otherwise are not adaptable to be used with magnetic drums such as the drum 80 of FIG. 1.

The subject apparatus for refining materials such as scrap metal represents a substantial improvement over all known and available apparatus used for this purpose. Furthermore, the subject apparatus is adaptable to being made fully automatic, and is also able to produce a product which is extremely dense and yet fluent enough to be readily and easily handled by most known types of handling and conveying equipment. For example, scrap steel material, can be refined accordingly to the present invention to densities of 80 to 150 pounds per cubic foot and even denser and is readily adaptable to being conveyed, poured, divided, transported and stored by many known and available devices.

Thus, there has been shown and described novel means for refining material such as scrap metal and the like which fulfills all of the objects and advantages sought therefor. Many changes, variations, and modifications of the subject means, however, will become apparent to those skilled in the art after considering this specification and the accompanying drawings. All such changes, variations, and modifications which do not depart from the spirit and scope of the invention are deemed to be covered by the invention which is limited only by the claims which follow.

What is claimed is:

1. In a material refining system including means for shredding unrefined material to produce a mass of individual pieces therefrom, and means for separating the more ferrous from the less ferrous bearing pieces, the improvement comprising means for densifying the individual ferrous bearing pieces while maintaining the individuality of the pieces and the fluency of the mass, said last named means including a housing having a rotatable hammer unit positioned therein, said hammer unit having at least one relatively blunt ended hammer mounted thereon for movement along a hammer circle in said housing, and a plurality of spaced individual grate bars positioned adjacent to the hammer circle under the hammer unit, each of said grate bars having a work engaging surface facing the hammer circle and set at an angle relatively to the hammer circle to present a continuously narrowing space to the hammer as the hammer moves past whereby said hammer produces a plurality of succeeding wedging and rolling up actions on individual pieces positioned on the grate bars each time the hammer moves past the grate bars, said wedging and rolling up actions increasing the density and reducing the sizes of the pieces until the pieces are small enough to pass between adjacent spaced grate bars.

2. A hammermill comprising a housing and a rotatable hammer unit positioned therein, said hammer unit including a rotor with a plurality of circumferentially and axially spaced hammers mounted thereon, said hammers being arranged in opposed pairs along the rotor, the hammers of adjacent pairs being positioned at an angle on the rotor, an inclined chute positioned on one side of the rotor and extending upwardly and outwardly from below one side of the rotor, spaced side walls positioned along opposite sides of said chute, and a curtain wall positioned substantially vertically and extending downwardly between the spaced walls to adjacent said chute, said curtain wall including an endless belt of interconnected wall pieces and upper and lower sprocket means for mounting said belt, said curtain wall being pivotally suspended in said chute from said upper sprocket means, means connected to said upper sprocket means for driving the belt in a direction to engage and move materials on the chute toward the hammer unit, and reversible power means connected to said curtain wall adjacent said lower sprocket means for pivoting said curtain wall about said upper sprocket means to control the spacing between the lower end of the curtain wall and said chute.

3. Means for refining materials such as scrap metal comprising material shredding means including a housing and a rotor positioned therein, said rotor having a plurality of hammer members mounted thereon, said hammers being constructed and positioned on the rotor to engage and to shred or break up incoming material into smaller size pieces, output means associated with the shredding means including means for magnetically separating the ferrous from the nonferrous substances, means for densifying the individual pieces of ferrous substance, said densifying means including a second housing having a rotor assembly therein, said last named rotor assembly having at least one relatively blunt ended hammer pivotally mounted thereon and movable along a hammer circle, and a stationary member positioned in said second housing, said stationary member having a plurality of spaced surfaces thereon that face the hammer circle at spaced locations therealong, each of said surfaces being positioned at an angle relative to the hammer circle such that during the time the hammer moves past each surface it moves continuously closer to said surface whereby individual pieces of material positioned in the spaces between the hammer and each of said surfaces are wedged and rolled up thereby increasing the density of the individual pieces.

4. Means for refining scrap metal and the like comprising means for fragmentizing a mass of unrefined scrap, means for crushing and feeding the unrefined scrap to the aforesaid fragmentizing means, said crushing and feeding means including a feed chute having a sloping bottom wall, spaced side walls, and a hingedly suspended overhead wall extending downwardly between the spaced walls to adjacent the said bottom wall, said overhead wall having a continuous driven outer surface which engages scrap moving down the bottom wall and simultaneously crushes and feeds the scrap to the aforesaid fragmentizing means, means for receiving fragmentized scrap from the fragmentizing means including means for separating the more ferrous from the less ferrous fragments, and means for densifying the more ferrous fragments including means for rolling and folding the more ferrous fragments into compact high density fragments by a series of individual wedging and rolling up actions.

5. A material shredding and reducing hammermill comprising: a housing and a rotatable hammer rotor unit positioned therein; hammers operably mounted on said hammer rotor unit; a rigid and stationary inclined chute connected to said housing at one side of said hammer rotor and extending upwardly and outwardly from said hammer rotor unit; side walls on said housing with certain of said side walls enclosing said chute; and material feed control means disposed in said chute between said side walls and above the level of said hammer rotor unit, said feed control means extending upwardly from said inclined chute and including an upper shaft operably mounted in said side walls, a frame pivotally and swingably depending from said upper shaft, a lower shaft rotatably mounted in and also movable with said swingable frame, material crusher means movable about said lower shaft adjacent said chute, said crusher means cooperating with said chute to crush material thereon and pass it into said hammer rotor unit means driving said upper shaft, said crusher means having a drive connection with said upper shaft, and reversible power means connected to said frame adjacent said lower shaft to swing said frame about said upper shaft and position said material crusher means at said lower shaft in variably spaced relation with said chute.

6. Means for feeding material to a shredding machine comprising a housing, a rotatable hammer unit in said housing, a plurality of hammers on said unit in position to shred incoming material, a chute having side walls and a rigid inclined bottom wall sloping into said hammer unit to direct material into said unit by gravity, and means suspended from an overhead location in said chute and normally hanging by gravity from an upper end to extend downwardly adjacent said sloping bottom wall and above said unit, said means including an upper drive shaft supporting said means from said upper end in the side walls, a frame having one end swingable on said drive shaft and an opposite lower end adjacent said sloping bottom wall, material crusher means movable about said lower end of said frame to engage material on said inclined bottom wall, said crusher means being driven by said upper drive shaft, and control means connected to said frame to swing the latter out of its normally hanging position to locate said material crusher means spaced from said chute bottom wall to more or less crush material against said sloping wall and pass it to said unit.

References Cited by the Examiner
UNITED STATES PATENTS

| | | |
|---|---|---|
| 496,260 | 4/1893 | Haugen. |
| 858,772 | 7/1907 | Williams _____ 241—189 |
| 1,656,063 | 1/1928 | Harrison. |
| 1,673,465 | 6/1928 | McLaughlin et al. ____ 241—186 |
| 1,828,490 | 10/1931 | Clement _____ 241—186 X |
| 2,059,229 | 11/1936 | Gregg. |
| 2,150,984 | 3/1939 | Near et al. _____ 241—186 |
| 2,844,184 | 7/1958 | Vollmer _____ 241—166 X |
| 2,942,792 | 6/1960 | Anderson et al. _____ 241—24 X |
| 2,959,364 | 11/1960 | Anderson et al. _____ 241—200 |
| 2,971,703 | 2/1961 | Rath _____ 241—29 X |
| 3,022,956 | 2/1962 | Haseman _____ 241—24 |
| 3,073,536 | 1/1963 | Quinn _____ 241—76 |
| 3,106,152 | 10/1963 | Coffelt _____ 100—152 X |
| 3,112,078 | 11/1963 | Sears et al. _____ 241—76 |

WALTER A. SCHEEL, *Primary Examiner.*

BILLY J. WILHITE, *Examiner.*